(12) United States Patent
Jue et al.

(10) Patent No.: US 6,718,488 B1
(45) Date of Patent: Apr. 6, 2004

(54) METHOD AND SYSTEM FOR RESPONDING TO A FAILED BUS OPERATION IN AN INFORMATION PROCESSING SYSTEM

(75) Inventors: Stephen D. Jue, Austin, TX (US); Todd R. Martin, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/390,014

(22) Filed: Sep. 3, 1999

(51) Int. Cl.$^7$ ................................................. G06F 11/00
(52) U.S. Cl. ........................... 714/43; 714/23; 714/51; 714/55; 714/56; 710/110
(58) Field of Search .......................... 714/43, 22, 23, 714/24, 51, 55, 56; 710/310, 110

(56) References Cited

U.S. PATENT DOCUMENTS

| | | | | |
|---|---|---|---|---|
| 5,065,313 | A | | 11/1991 | Lunsford .................... 395/275 |
| 5,367,697 | A | * | 11/1994 | Barlow et al. ................. 714/35 |
| 5,465,346 | A | | 11/1995 | Parks et al. .................. 395/296 |
| 5,511,161 | A | * | 4/1996 | Sato et al. ..................... 714/10 |
| 5,513,319 | A | * | 4/1996 | Finch et al. ................... 714/55 |
| 5,530,946 | A | | 6/1996 | Bouvier et al. ......... 395/182.21 |
| 5,657,457 | A | | 8/1997 | Gaskins ....................... 395/287 |
| 6,112,320 | A | * | 8/2000 | Dien .............................. 714/55 |
| 6,292,910 | B1 | * | 9/2001 | Cummins .................... 714/43 |
| 6,311,296 | B1 | * | 10/2001 | Congdon ..................... 714/56 |
| 6,393,570 | B1 | * | 5/2002 | Henderson et al. ......... 713/310 |
| 6,438,709 | B2 | * | 8/2002 | Poisner ........................ 714/23 |

OTHER PUBLICATIONS

Tanenbaum, Andrew S., Structured Computer Organization, 1990, Prentice Hall, Inc., pp. 11–13.*
Intel 82801AA (ICH) and Intel 82801AB (ICH0) I/O Controller Hub Datasheet, Jun. 1999, sections 8.8.3.1–8.8.3.16 and 8.9.1–8.9.11.*
Intel i810 TCO Watchdog Linux Treiber; http://www.kernelconcepts.de/products/i810–tco/.*
Using the Intel ICH Family Watchdog Timer (WDT), Sep. 2002, Revision 001, all pages.*
*The I$^2$C–Bus Specification* (Version 2.0 Dec. 1998), available from Philips Semiconductor, Inc.
*82371AB PCI ISA IDE Xcelerator* (*PIIX4*) specification, Section 11.5.4, available from Intel Corporation.
*System Management Bus Specification* (Revision 1.1 Dec. 11, 1998), available from Benchmarq Microelectronics, Inc.

* cited by examiner

*Primary Examiner*—Scott Baderman
*Assistant Examiner*—Michael Maskulinski
(74) *Attorney, Agent, or Firm*—Baker Botts L.L.P.

(57) ABSTRACT

In an information processing system, a failed bus operation is detected. In response to the detecting, a primary power plan is cycled in the information processing system.

34 Claims, 6 Drawing Sheets

METHOD AND SYSTEM FOR RESPONDING TO A FAILED BUS OPERATION IN AN INFORMATION PROCESSING SYSTEM

BACKGROUND

1. Technical Field

This patent application relates, in general, to information processing systems and, in particular, to a method and system for responding to a failed bus operation in an information processing system.

2. Description of the Related Art

Various information processing systems manipulate, process, and store information. Personal computer systems, and their associated subsystems are examples of information processing systems.

Personal computer systems typically include a motherboard for mounting at least one microprocessor and other application specific integrated circuits (ASICs), such as memory controllers and input/output (I/O) controllers. Many motherboards include slots for additional adapter cards to provide additional function to the computer system. Typical functions that a user might add to a computer include additional microprocessors, additional memory, fax/modem capability, sound cards, or graphics cards. The slots included on the motherboard generally include in-line electrical connectors having electrically conductive lands which receive exposed tabs on the adapter cards. The lands are connected to wiring layers, which in turn are connected to a bus that allows the cards to communicate with the microprocessor or other components in the system.

A personal computer system may include many different types of buses to link the various components of the system. One type of bus is a "master-slave" bus, which refers to a bus architecture in which, during any transaction involving the bus, a bus device (the master) controls one or more other devices (the slaves). One example of a master-slave bus is the I$^2$C (Inter-Integrated Circuit (IC)) bus, which is used to connect integrated circuits. I$^2$C is a multi-master bus, so that multiple chips can be connected to the same bus and each one can act as a master by initiating an information (e.g. data and/or address) transfer. Another example of a master-slave bus is the System Management Bus (SMBUS). The SMBUS is a master-slave bus through which simple power-related chips can communicate with the rest of an information processing system.

Personal computer systems often use internal busses such as the I$^2$C Bus, SMBUS, or other expansion busses to initialize and interrogate devices (e.g., memory components, environmental probes, clock synthesizers). These devices may exist on the same bus as interchangeable master or slave devices and operate using similar master-slave protocols.

The I$^2$C Bus physically consists of 2 active wires and a ground connection. The active wires are Serial DAta line (SDA) and the Serial CLock line (SCL). Both active wires (SDA and SCL) are bi-directional.

An integrated circuit hooked on the I$^2$C Bus may have its own unique address. For example, the integrated circuit may be a memory component, environmental probe, or clock synthesizer. These integrated circuits can act as a receiver and/or transmitter depending on their functionality.

Because the SDA is a serial line, an I$^2$C Bus slave device retains control of the I$^2$C Bus long enough for the slave device to complete its tasks and serially transmit the information appropriate to the slave device's task back over the SDA to its master. This is accomplished by the slave device holding the SCL low. After the device has finished transmitting, the slave device toggles the SCL high, which tells the master that the slave has completed its task and that the master can resume its functioning.

Typically, each I$^2$C Bus device operating under a master-slave protocol contains an internal state machine that handles the protocols related to toggling the SCL. However, it has been discovered that, if a cycle is interrupted, or a timing parameter is not met correctly, the state machine of the slave device can enter an erroneous state wherein the slave device may fail to toggle the SCL line. Accordingly, the master might fail to resume processing, thereby locking the I$^2$C Bus and making use of the I$^2$C Bus impractical.

The forgoing has described the "locking" of an I$^2$C Bus arising from the malfunctioning of a state machine at a slave device. However, those skilled in the art will recognize that similar problems can also arise in the functioning of SMBUS, which typically uses an I$^2$C Bus as its backbone.

Those skilled in the art will recognize that the locking of an I$^2$C Bus or an SMBUS, if it occurs very early in the initialization of an information processing system, might manifest as the system not detecting any memory and stopping prior to video being initialized which would prevent visible feedback of the problem (e.g., the display could present the problem with the system, but if the defect stops the video from being initialized, the system is unusable, and a human user has no indication of why the system is not functioning). Those skilled in the art will also recognize that the locking of an I$^2$C Bus or an SMBUS, should it occur somewhat later in the initialization of an information processing system, might manifest as the loss of environmental probes which would prevent the system from properly handling over-temperature conditions. Those skilled in the art will recognize that the foregoing-described manifestations of the locking of an I$^2$C Bus or an SMBUS are merely examples, and that the locking of an I$^2$C Bus or an SMBUS can manifest in many different ways.

Many devices that reside on an I$^2$C Bus or an SMBUS are designed with minimal pin count packages. Accordingly, when an I$^2$C Bus or an SMBUS becomes "locked" due to state machine malfunction, it might be necessary to change the power pin (Vcc) in order to reset the malfunctioning devices' internal state machine and thereby regain use of the bus.

Accordingly, a need exists in the art for detecting and remedying a locked master-slave bus, such as the I$^2$C Bus or the SMBUS bus.

SUMMARY

In an information processing system, a failed bus operation is detected. In response to the detecting, a primary power plan is cycled in the information processing system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of this patent application will become apparent in the non-limiting detailed description set forth below.

BRIEF DESCRIPTION OF THE DRAWING

The use of the same reference symbols in different drawings indicates similar or identical items.

DETAILED DESCRIPTION

The division of the detailed description into separate sections is merely done as an aid to understanding and is in no way intended to be limiting.

I. Environment

Figure 1:
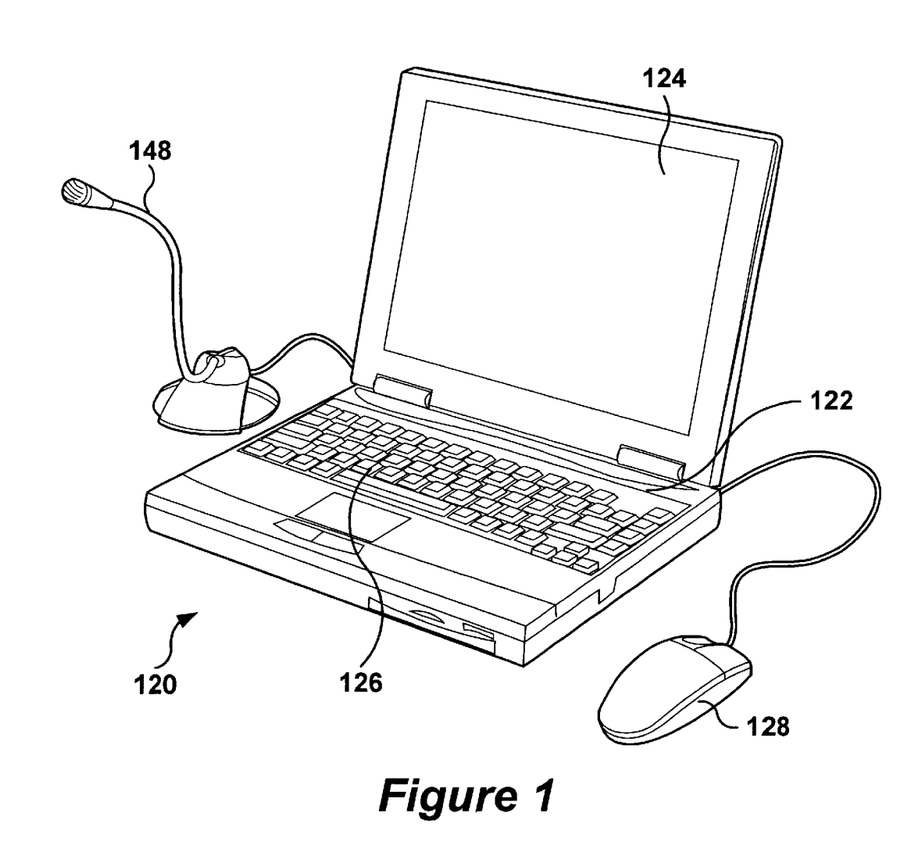
FIG. 1 is a pictorial representation of an information processing system which can be utilized in accordance with the method and system of an illustrative embodiment.

With reference now to the figures and in particular with reference now to FIG. 1, there is depicted a pictorial representation of an information processing system which can be utilized in accordance with the method and system of an illustrative embodiment. A graphical user interface system and method can be implemented with the information processing system depicted in FIG. 1. An information processing system 120 is depicted which includes a system unit 122, a video display device 124, a keyboard 126, a mouse 128, and a microphone 148. Information processing system 120 may be implemented utilizing any suitable computer such as an IBM-compatible or an Apple-compatible computer.

Figure 2:
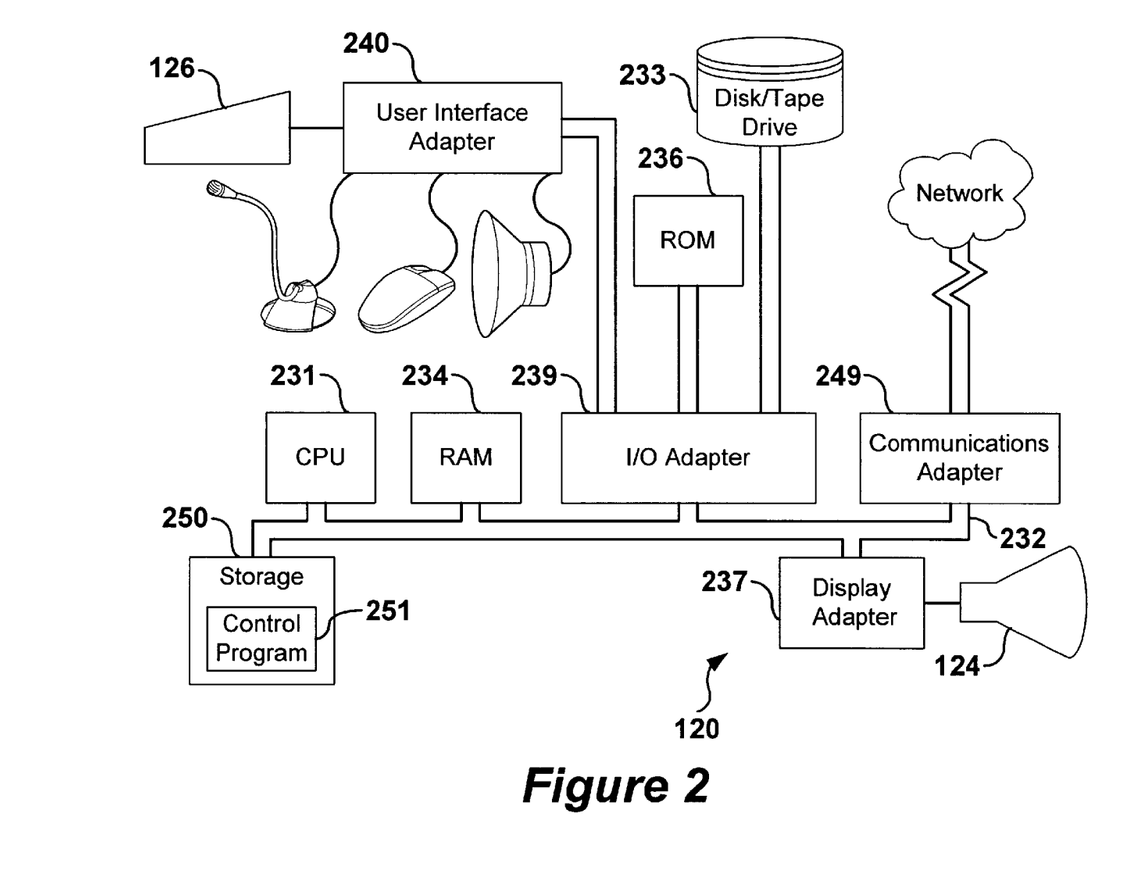
FIG. 2 is a block diagram of a representative hardware environment, which incorporates a graphical user interface, which can be utilized in accordance with the method and system of an illustrative embodiment.

FIG. 2 is an illustration of a representative hardware environment, which incorporates a graphical user interface. FIG. 2 depicts selected components in information processing system 120 in which an illustrative embodiment may be implemented. Information processing system 120 includes a Central Processing Unit ("CPU") 231, such as a conventional microprocessor, and a number of other units interconnected via system bus 232. Such components and units of information processing system 120 can be implemented in a system unit such as unit 122 of FIG. 1. Information processing system 120 includes random-access memory ("RAM") 234, read-only memory ("ROM") 236, display adapter 237 for connecting system bus 232 to video display device 124, and I/O adapter 239 for connecting peripheral devices (e.g., disk and tape drives 233) to system bus 232. Video display device 124 is the visual output of information processing system 120, which can be a CRT-based video display well-known in the art of computer hardware. However, with a portable or notebook-based computer, video display device 124 can be replaced with an LCD-based or a gas plasma-based flat-panel display. Information processing system 120 further includes user interface adapter 240 for connecting keyboard 126, mouse 128, speaker 246, microphone 148, and/or other user interface devices, such as a touch screen device (not shown), to system bus 232 through I/O adapter 239. Communications adapter 249 connects information processing system 120 to an information processing network.

Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. Other technologies can also be utilized in conjunction with CPU 231, such as touch-screen technology or human voice control. In addition, information processing system 120 includes a control program 251 which resides within computer storage 250. Control program 251 contains instructions that when executed on CPU 231 carries out application program (e.g., videoconferencing software) operations.

Those skilled in the art will appreciate that the hardware depicted in FIG. 2 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that information processing system 120 can be described in relation to information processing systems which perform essentially the same functions, irrespective of architectures. As an example of such, an alternative partial architecture information processing system 120 is set forth in FIG. 3.

Figure 3:
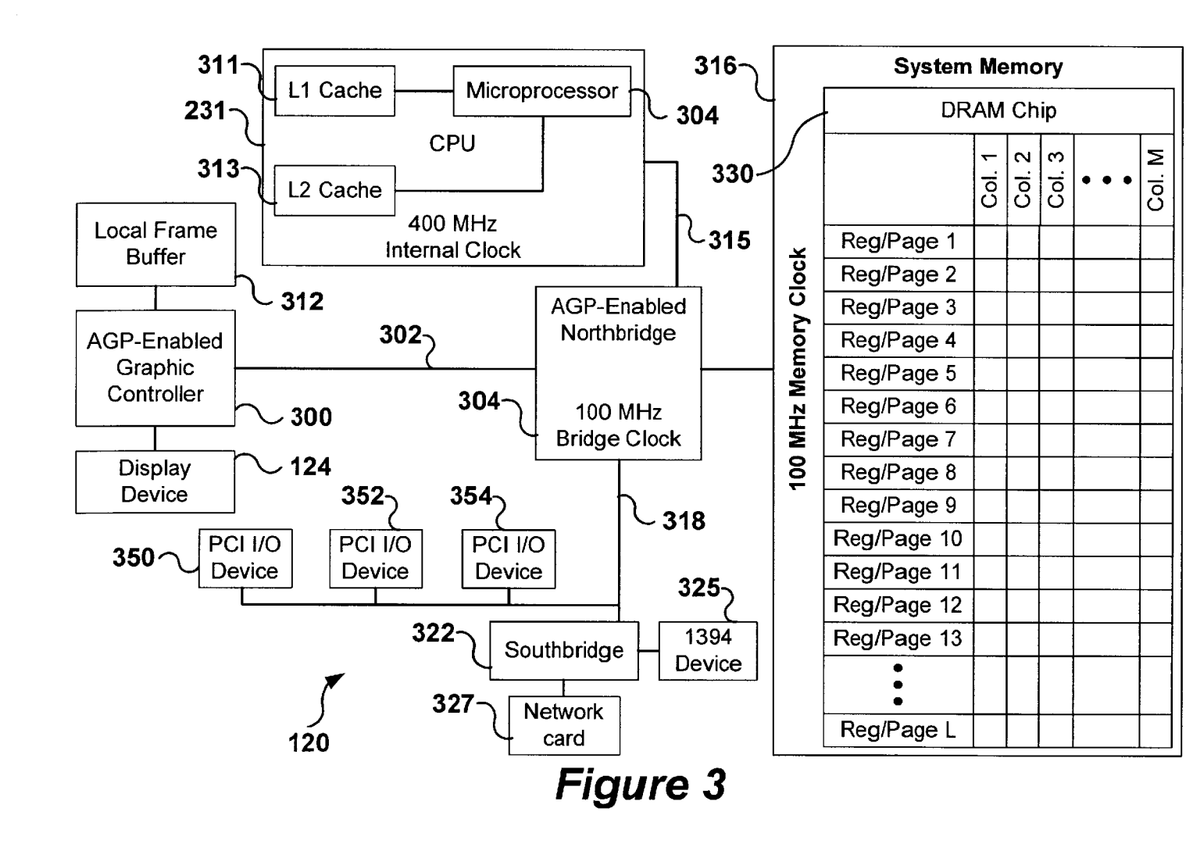
FIG. 3 is a high-level component diagram depicting an information processing system which illustrates another environment wherein one or more embodiments may be practiced.

Referring now to FIG. 3, shown is a high-level component diagram depicting a partial information processing system 120 which illustrates another environment wherein one or more embodiments may be practiced. Shown are AGP-enabled graphics controller 300, AGP interconnect 302 (a data bus), and AGP-enabled Northbridge 304. Furthermore, deemed present is an AGP-enabled operating system. The term AGP-enabled is intended to mean that the so-referenced components are engineered such that they interface and function under the standards defined within the AGP interface specification (Intel Corporation, *Accelerated Graphics Port Interface Specification*, Revision 1.0 (Jul. 31, 1996)). Further depicted are video display device 124, local frame buffer 312, Central Processing Unit (CPU) 231 (wherein are depicted microprocessor 309, L1 Cache 311, and L2 Cache 313), CPU bus 315, system memory 316, Peripheral Component Interconnect (PCI) bus 318, various PCI Input-Output (I/O) devices 350, 352, and 354, Southbridge 322, 1394 Device 325, and network card 327.

The foregoing components and devices are used herein as examples for sake of conceptual clarity. Thus, CPU 231 is utilized as an exemplar of any general processing unit, including but not limited to multiprocessor units; CPU bus 315 is utilized as an exemplar of any processing bus, including but not limited to multiprocessor buses; PCI devices 350–354 attached to PCI bus 318 are utilized as an exemplar of any input-output devices attached to any I/O bus; AGP Interconnect 302 is utilized as an exemplar of any graphics bus; AGP-enabled graphics controller 300 is utilized as an exemplar of any graphics controller; Northbridge 304 and Southbridge 322 are utilized as exemplars of any type of bridge; 1394 device 325 is utilized as an exemplar of any type of isochronous source; and network card 327, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 304, Southbridge 322, and other bridges shown in that it is to be understood that such can translate and coordinate between various data buses and/or devices which communicate through the bridges.

II. Locked Bus Detection and Remedy

The following discussion assumes familiarity with *The I²C-Bus Specification* (Version 2.0 December 1998), available from Philips Semiconductor, Inc., the 82371AB *PCI ISA IDE Xcelerator (PIIX4)* specification, Section 11.5.4, available from Intel Corporation, and the *System Management Bus Specification* (Revision 1.1 Dec. 11, 1998), available from Benchmarq Microelectronics, Inc., which are hereby incorporated by reference in their entirety.

Figure 4:
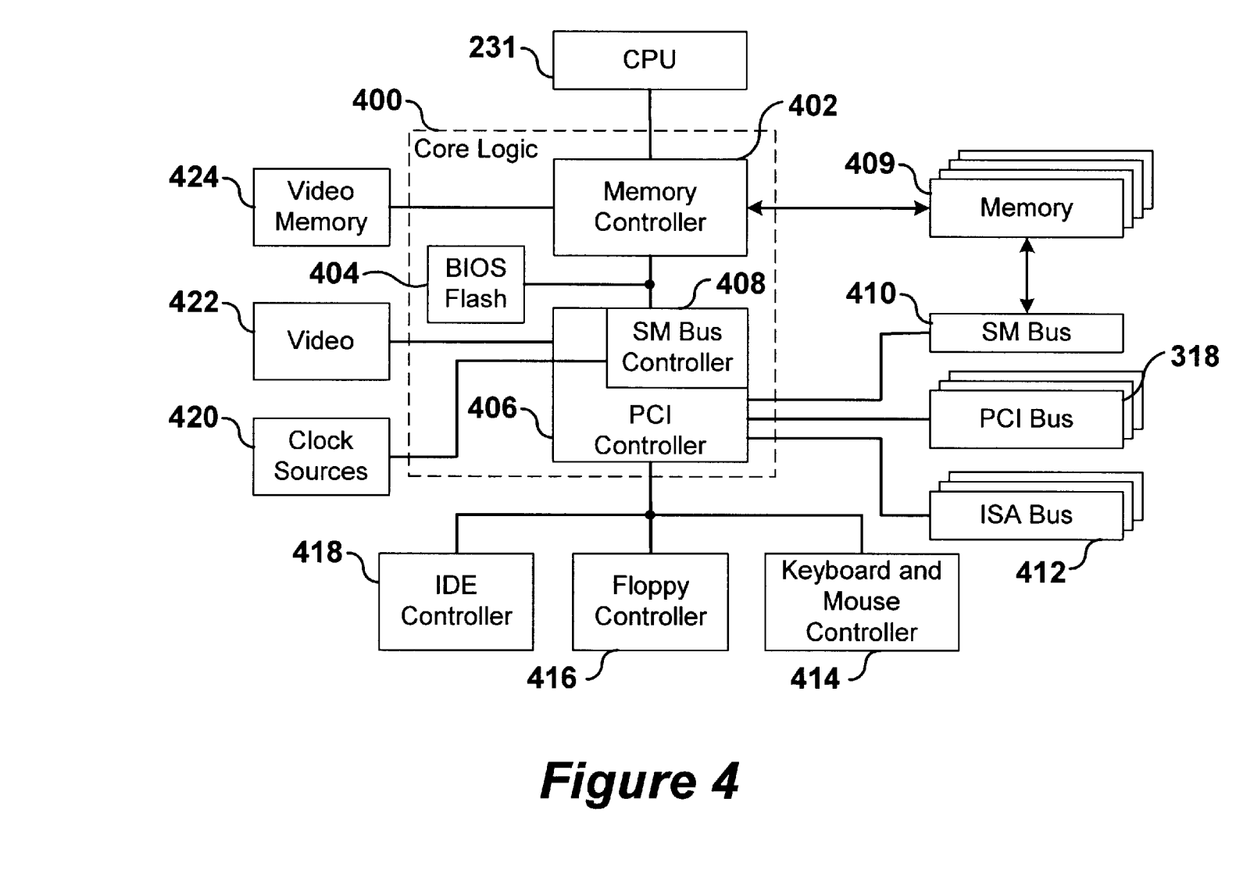
FIG. 4 is a high-level functional block diagram which illustrates "core logic," as used herein, and functional relationships between various information processing system components and that core logic.

With reference now to FIG. 4, shown is a high-level functional block diagram which illustrates "core logic," as used herein, and functional relationships between various information processing system components and that core logic. Illustrated is core logic 400. Shown contained within core logic 400 are memory controller 402, Basic Input-Output System (BIOS) flash memory 404 (which contains the BIOS program actually run when the system is powered up), PCI controller 406 within which is depicted SMBUS controller 408. Shown for sake of illustration are various components which functionally interact with core logic 400, such as CPU 231, memory 409, SMBUS 410, PCI Bus 318, ISA Bus 412, Keyboard and Mouse Controller 414, Floppy Controller 416, IDE Controller 418, clock sources 420, video 422, and video memory 424.

Figure 5:
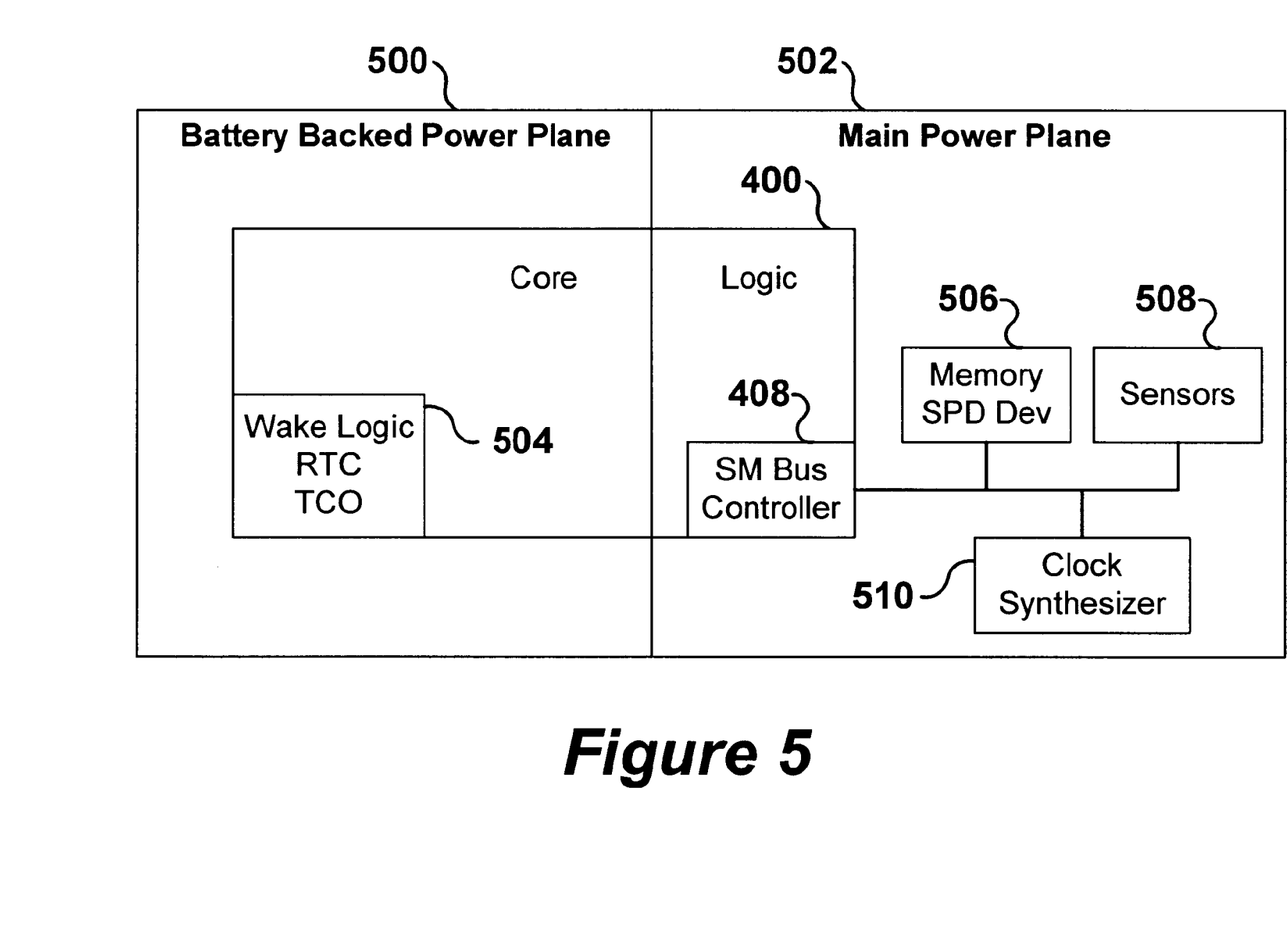
FIG. 5 is a partially-schematic diagram which illustrates core logic 400 in the context of battery-backed power plane 500 and main, or primary, power plane 502.

Referring now to FIG. 5, depicted in a partially-schematic diagram which illustrates core logic 400 in the context of battery-backed power plane 500 and main, or primary, power plane 502. Shown for sake of illustration is that core logic functionally "spans," or communicates with, battery-backed power plane 500 and main, or primary, power plane 502. Depicted as resident within core logic 400 is wake logic 504. Those skilled in the art will recognize that various timing devices could constitute part of wake logic 504. Shown for sake of illustration is that wake logic 504 contains access to a system real time clock (RTC) and/or Total Cost of Ownership (TCO) set of registers, which those skilled in the art will recognize as having watchdog-timer-like capabilities. Further shown are memory serial presence detect (SPD) device 506, which is representative of an I²C memory device, sensors 508, and clock synthesizer 510 all of which are shown in communication with SMBUS controller 408.

As shown, wake logic 504 is powered by battery-backed power plane 500. One significance aspect of wake logic 504 being powered by battery-backed power plane 500 is that wake logic 504 can be used to cycle main, or primary, power plane 502 via a process described below.

Figure 6:
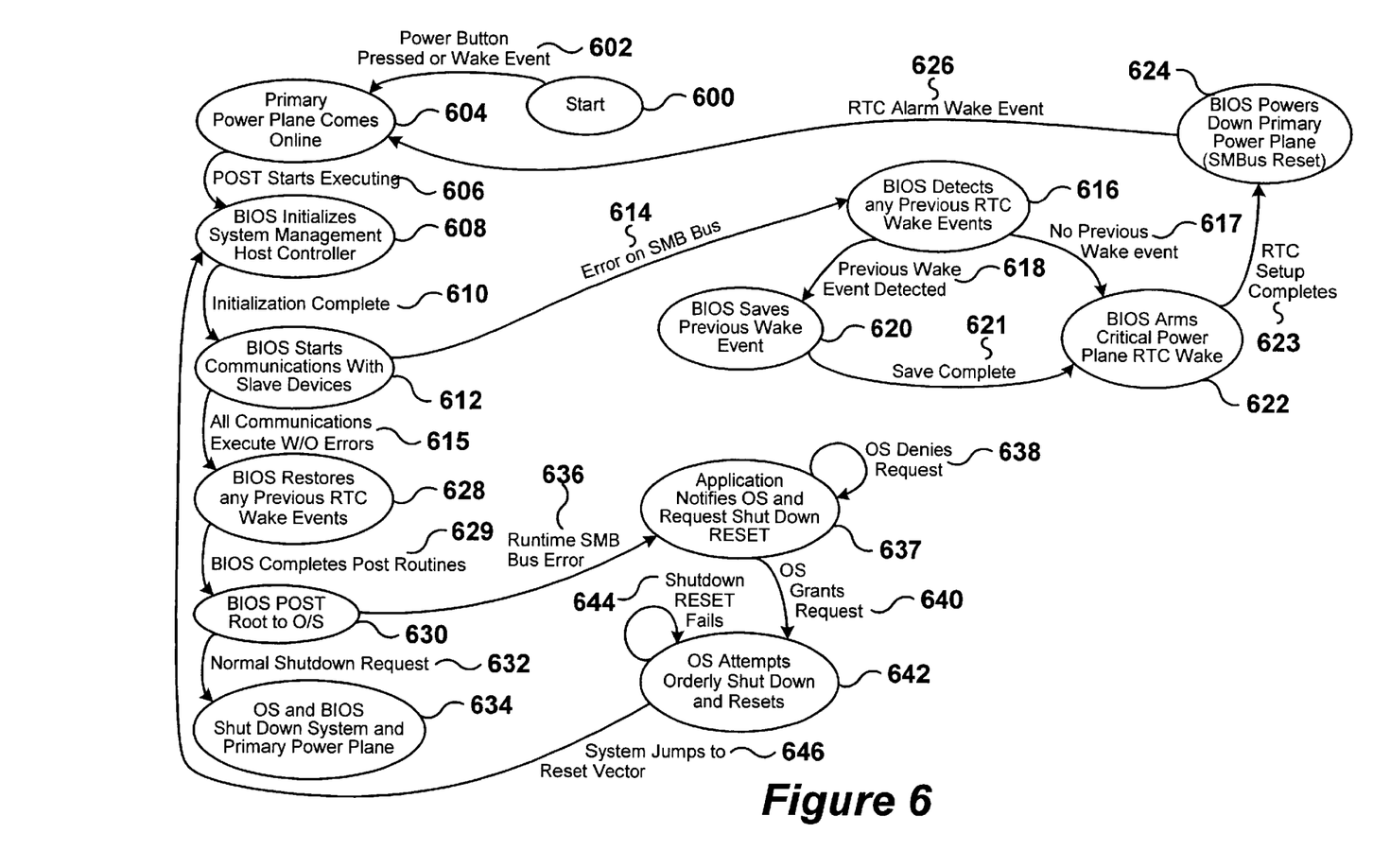
FIG. 6 is a high-level logic state diagram illustrating a process by which a locked bus may be detected and remedied.

Referring now to FIG. 6, depicted is a high-level logic state diagram illustrating a process by which a locked bus may be detected and remedied. Method step 600 shows the start of the process. Method step 602 depicts activation of a main power switch of an information processing system (e.g., a human user pressing the power button on an information processing system or the occurrence of a system Real Time Clock (RTC) wake event). Method step 604 illustrates that subsequent to the activation of the main power switch of an information processing system, a primary power plane (such as primary power plane 502 illustrated in FIG. 5) comes on line (i.e., is energized). Thereafter, illustrated in method step 606 is that the BIOS begins executing its power-on self test (POST) routines, a series of diagnostic tests (e.g., testing the memory units such as RAM or ROM of a system, the keyboard, the disk drives, etc.) which run automatically when an information processing system is powered on. (Describing the BIOS as performing operations is a short-hand notation notorious within the art. See e.g., R. White, *How Computers Work* (4th ed. 1998), and/or R. White, *How Computers Work* (1993), as well as other editions of this same book, wherein the conventional operation of the BIOS is explained and wherein subsequently the BIOS is referenced in a shorthand way as an entity performing operations. It will be appreciated that conventionally the BIOS itself doesn't actually "do" anything else, nor does the O/S or any other software by itself. Instead, the information processing system performs various operations "in response to" the BIOS's instructions. However, it is possible that in the future hardware or firmware techniques may alter this conventional approach, and it is not intended that the embodiments described herein be limited to this conventional approach.)

Subsequent to the POST operation of method step 606, method step 608 illustrates that the basic input/output system (BIOS) assumes control and initializes an SMBUS master, or host, controller in the core chipset (e.g., SMBUS controller 408 illustrated in FIGS. 4 and 5).

Subsequent to initializing the SMBUS master, or host, controller, all remaining devices on the SMBUS bus can be considered "slave" devices. Accordingly, method step 610 shows another POST operation specifically tailored to power-on self testing of slave devices on the SMBUS.

Method step 612 shows that the BIOS starts querying, or communicating with, all slave devices on the SMBUS. Method step 614 shows that the flow of the process, if the querying of method step 612 results in a determination that any of the slave devices on the SMBUS are locked or "confused" (which equates to an error with respect to the SMBUS) is to method step 616. Method step 616 depicts that the BIOS checks to see if there is one or more preset system wake logic (e.g., wake logic 504, such as RTC or TCO) wake events scheduled. If there are no wake logic wake events scheduled, the process proceeds 617 to method step 622 (described below).

In the event that the BIOS determines that there is one or more wake logic wake events scheduled, the process proceeds 618 to method step 620 which depicts that the BIOS stores the one or more detected preset system wake logic wake events (these events may later be subsequently reused when the locked bus problem has been rectified). Thereafter, once the save process has completed the process proceeds 621 to method step 622.

Method step 622 illustrates that the BIOS arms the critical (or main, or primary) power plane wake logic wake event (i.e., the BIOS schedules RTC wake up at a particular instant of time). Thereafter, subsequent to the completion of the RTC wake event set up, the process proceeds 623 to method step 624 shows that the BIOS powers down the primary power plane (SMBUS reset). Subsequently, method step 626 which illustrates the occurrence of the RTC alarm wake event which was described as being set or scheduled in method step 622.

Returning now to method step 612, recall that method step 612 shows that the BIOS starts querying, or communicating with, all slave devices on the SMBUS. Method step 615 shows that the flow of the process, if the querying of method step 612 results in a determination that all of the slave devices on the SMBUS respond normally (i.e., no errors are detected with respect to the SMBUS), is to method step 628. Method step 628 depicts that the BIOS checks to see if there is one or more preset system wake logic (e.g., Real Time Clock (RTC)) wake events stored (e.g., such as the ones discussed in relation to method steps 618 and 620 and restores any RTC wake events previously stored). Thereafter, the BIOS completes the POST routines 629, and the process proceeds to method step 630.

Method step 630 shows that subsequent to the BIOS completing its POST routines, the boot operation brings up the operating system (O/S). Thereafter, it is assumed that the system functions normally until an application program, which runs in background mode and monitors the SMBUS detects 636 another problem with the SMBUS (e.g., a transaction involving a SMBUS times out, or a system timer monitoring a given operation involving the SMBUS expires), at which point method step 637 depicts that the application program sends a message to the O/S, directing the O/S to gracefully shut down the computer. In response to such a message, method step 640 shows that the O/S grants the shut down request. Alternatively, method step 638 shows a repeating loop in the event that the O/S denies the request to shut down, which illustrates that the request to shut down is repeated until it is granted 640.

Eventually, subsequent to either method step 637 or 638, the O/S grants 640 the shut down request. Thereafter, method steps 642 and 644 show that the O/S attempts shut down until the shut down is successful and once a successful shut down has occurred, the system jumps to reset vector 646. Thereafter, the process proceeds to method step 608 and executes from that point.

In addition to the foregoing, method steps 632 and 634 show that a normal shut down request can occur and that in response the O/S and BIOS will shut down the information processing system and main power plane in a fashion well known to those in the art.

The foregoing process described in relation FIG. 6, for sake of clarity and illustration, discusses the process in the context of an SMBUS. The I²C is typically a backbone for SMBUS, and thus that the above-set-forth process applies to I²C buses in that way. Furthermore, the above-set-forth process can be adapted to pure I²C bus with a minimal amount of development work.

The foregoing detailed description sets forth various embodiments via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. One embodiment is implemented via Application Specific Integrated Circuits (ASICs). Another embodiment is implemented via modification and use of a BIOS. However, those skilled in the art will recognize that the embodiments disclosed herein, in whole or in part, can be equivalently implemented in standard Integrated Circuits, as a computer program running on a computer or executing in a processor, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the illustrative embodiment are capable of being distributed as a program product in a variety of forms, and that an illustrative embodiment applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments have been shown and described, it will be obvious to those skilled in the art that, based upon the teachings herein, changes and modifications may be made without departing from the appended claims and their broader aspects and, therefore, the appended claims are to encompass within their scope all such changes and modifications as are within the true spirit and scope of the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to containing only one such element, even when same claim includes the introductory phrases "one or more" or "at least one" and indefinite articles such as "a" or "an"; the same holds true for the use of definite articles used to introduce claim elements.

What is claimed is:

1. A method comprising:

detecting a failed bus operation on a host by said host; and in response to said detecting, cycling a primary power plane by arming a Total Cost of Ownership primary power plane wake event on said host by said host.

2. The method of claim 1, wherein said detecting a failed bus operation further comprises:

communicating with one or more devices on a bus.

3. The method of claim 2, wherein said communicating with one or more devices on a bus further comprises:

communicating with one or more devices on an inter-integrated circuit bus.

4. The method of claim 2, wherein said communicating with one or more devices on a bus further comprises:

communicating with one or more devices on a system management bus.

5. The method of claim 2, wherein said communicating with one or more devices on a bus further comprises:

communicating with one or more slave devices on a bus.

6. The method of claim 1, wherein said detecting a failed bus operation further comprises:

identifying a locked bus condition.

7. The method of claim 6, wherein said identifying a locked bus condition further includes:

detecting a bus operation which has exceeded an allotted time.

8. The method of claim 7, wherein said detecting a bus operation which has exceeded an allotted time further includes:

detecting a transaction time out on a bus.

9. The method of claim 7, wherein said detecting a bus operation which has exceeded an allotted time further includes:

detecting an expiration of a timer related to a bus operation.

10. The method of claim 1, wherein said cycling a primary power plane further comprises:

powering down the primary power plane.

11. The method of claim 10, wherein said powering down the primary power plane further comprises:

an operating system causing power to be removed from the primary power plane.

12. The method of claim 10, wherein said powering down the primary power plane further comprises:

a Basic Input-Output system causing power to be removed from the primary power plane.

13. The method of claim 1, wherein said cycling a primary power plane further comprises:

jumping to a reset vector.

14. The method of claim 1, wherein said cycling a primary power plane further comprises:

a Basic Input-Output system causing power to be restored to the primary power plane.

15. A system comprising:

means for detecting a failed bus operation on a host by said host; and means, responsive to said means for detecting, for cycling a primary power plane by means for arming a Total Cost of Ownership primary power plane wake event on said host by said host.

16. The system of claim 15, wherein said means for detecting a failed bus operation further comprises:

means for communicating with one or more devices on a bus.

17. The system of claim 16, wherein said means for communicating with one or more devices on a bus further comprises:

means for communicating with one or more devices on an inter-integrated circuit bus.

18. The system of claim 16, wherein said means for communicating with one or more devices on a bus further comprises:

means for communicating with one or more devices on a system management bus.

19. The system of claim 16, wherein said means for communicating with one or more devices on a bus further comprises:

means for communicating with one or more slave devices on a bus.

20. The system of claim 15, wherein said means for detecting a failed bus operation further comprises:

means for identifying a locked bus condition.

21. The system of claim 20, wherein said means for identifying a locked bus condition further comprises:

means for detecting a bus operation which has exceeded an allotted time.

22. The system of claim 21, wherein said means for detecting a bus operation which has exceeded an allotted time further comprises:

means for detecting a transaction time out on a bus.

23. The system of claim 21, wherein said means for detecting a bus operation which has exceeded an allotted time further comprises:

means for detecting an expiration of a timer related to a bus operation.

24. The system of claim 15, wherein said means for cycling a primary power plane further comprises:

means for powering down the primary power plane.

25. The system of claim 24, wherein said means for powering down the primary power plane further comprises:

means for an operating system causing power to be removed from the primary power plane.

26. The system of claim 24, wherein said means for powering down the primary power plane further comprises:

means for a Basic Input-Output system causing power to be removed from the primary power plane.

27. The system of claim 15, wherein said means for cycling a primary power plane further comprises:

means for jumping to a reset vector.

28. The system of claim 15, wherein said means for cycling a primary power plane further comprises:

means for a Basic Input-Output system causing power to be restored to the primary power plane.

29. The system of claim 15, wherein said means for detecting and means for cycling further comprise:

a computer program executing in a processor.

30. The system of claim 15, wherein said means for detecting and means for cycling further comprise:

hardware.

31. The system of claim 15, wherein said means for detecting and means for cycling further comprise:

firmware.

32. The system of claim 15, further comprising:

signal bearing-media bearing said means for detecting and said means for cycling.

33. The system of claim 32, wherein said signal bearing media further includes recordable media.

34. The system of claim 32, wherein said signal bearing media further includes transmission media.

* * * * *